United States Patent
DePoi et al.

(10) Patent No.: US 12,118,352 B2
(45) Date of Patent: *Oct. 15, 2024

(54) CODE INTERDEPENDENCY ANALYSIS SYSTEM

(71) Applicant: Evernorth Strategic Development, Inc., St. Louis, MO (US)

(72) Inventors: Brittany P. DePoi, South Windsor, CT (US); Jonathan E. Magen, Jenkintown, PA (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,262

(22) Filed: Nov. 14, 2023

(65) Prior Publication Data

US 2024/0078109 A1 Mar. 7, 2024

Related U.S. Application Data

(63) Continuation of application No. 17/505,722, filed on Oct. 20, 2021, now Pat. No. 11,847,449.

(51) Int. Cl.
 *G06F 8/77* (2018.01)
(52) U.S. Cl.
 CPC ...................................... *G06F 8/77* (2013.01)
(58) Field of Classification Search
 CPC ......................................................... G06F 8/77
 See application file for complete search history.

(56) References Cited

U.S. PATENT DOCUMENTS

| | | | |
|---|---|---|---|
| 9,507,886 B2 | 11/2016 | Fiege | |
| 9,619,224 B2 | 4/2017 | Tibble | |
| 9,740,591 B2 | 8/2017 | Tibble | |
| 9,830,148 B1 * | 11/2017 | Mo | ........................... G06F 8/77 |

(Continued)

OTHER PUBLICATIONS

A. MacCormack, J. Rusnak, and C. Y. Baldwin, "The impact of component modularity on design evolution: Evidence from the software industry," Harvard Business School Technology & Operations Mgt. Unit Research Paper , No. 08-038, 2007.
Abdalkareem, Rabe, Emad Shihab, and Juergen Rilling. "On code reuse from stackoverflow: An exploratory study on android apps." Information and Software Technology 88 (2017): 148-158.

(Continued)

*Primary Examiner* — Qing Chen
*Assistant Examiner* — Amir Soltanzadeh
(74) *Attorney, Agent, or Firm* — Schwegman Lundberg & Woessner, P.A.

(57) ABSTRACT

A system and method of generating a reuse metric starts with a processor receiving from a client device, a program comprising modules. Processor extracts the modules from the program and generates frequency tables associated with the modules. Frequency tables includes numbers of imports associated with the modules, and import ratios associated with the modules. Processor generates, based on the frequency tables, a histogram of the modules and the import ratios. Processor generates key statistical measures based on the import ratios and the histogram. Generating the key statistical measures comprises determining histogram weights, determining a Pareto fit of the histogram, and generating a reuse metric based on the Pareto fit and a Kurtosis of the histogram weights. Processor causes the client device to display the reuse metric and the histogram. Other embodiments are disclosed herein.

20 Claims, 6 Drawing Sheets

(56) References Cited

U.S. PATENT DOCUMENTS

| | | | |
|---|---|---|---|
| 10,296,658 B2 | 5/2019 | Le Biannic | |
| 10,380,265 B2 | 8/2019 | Martinez Corria | |
| 10,441,811 B2 | 10/2019 | Isola | |
| 10,453,142 B2 | 10/2019 | Mun | |
| 10,512,790 B2 | 12/2019 | Kuusela | |
| 10,850,120 B2 | 12/2020 | Laaksonen | |
| 10,922,218 B2 | 2/2021 | Fox | |
| 10,963,373 B2 | 3/2021 | Fox | |
| 11,093,241 B2 * | 8/2021 | Shah | G06F 11/362 |
| 2011/0239195 A1 | 9/2011 | Lin | |
| 2018/0032422 A1 | 2/2018 | Tibble | |
| 2018/0043182 A1 | 2/2018 | Wu | |
| 2019/0272329 A1 | 9/2019 | Martinez Corria | |
| 2020/0110601 A1 * | 4/2020 | Shah | G06F 11/3612 |
| 2020/0310763 A1 * | 10/2020 | Fox | G06F 21/563 |
| 2020/0310953 A1 | 10/2020 | Fox | |
| 2021/0138267 A1 | 5/2021 | Nord | |
| 2022/0383900 A1 * | 12/2022 | Goker | G11B 5/40 |

OTHER PUBLICATIONS

Bezanson, Jeff, et al. "Julia: A fresh approach to numerical computing." SIAM review 59.1 (2017): 65-98.

Frakes, William B., and Giancarlo Succi. "An industrial study of reuse, quality, and productivity." Journal of Systems and Software 57.2 (2001): 99-106.

Lorenz, David H., and Boaz Rosenan. "A Comparative Case Study of Code Reuse With Language Oriented Programming." arXiv preprint arXiv:1103.5901 (2011).

Mockus, Audris. "Large-scale code reuse in open source software." First International Workshop on Emerging Trends in FLOSS Research and Development (FLOSS'07: ICSE Workshops 2007). IEEE, 2007.

Semgrep—Find bugs and enforce code standards., https://semgrep.dev/, accessed as early as Apr. 7, 2021.

Tung, Yuan-Hsin, Chih-Ju Chuang, and Hwai-Ling Shan. "A framework of code reuse in open source software." The 16th Asia-Pacific Network Operations and Management Symposium. IEEE, 2014.

U. Friedrichsen, "The Broken Promise of Re-Use," https://blog.codecentric.de/en/2015/10/the-broken-promise-of-re-use/ Codecentric Blog, , Oct. 14, 2015.

* cited by examiner

CODE INTERDEPENDENCY ANALYSIS SYSTEM

CROSS REFERENCE TO RELATED APPLICATIONS

This application is a continuation of U.S. application Ser. No. 17/505,722, which was filed Oct. 20, 2021. The entire disclosure of said application is incorporated herein by reference.

BACKGROUND

Complex software grows and evolves to include a large number of modules such that developers need tools to help generate and manage the software. For instance, tools are needed to help automate documentation, linting (e.g., to flag programming errors, bugs, stylistic errors and suspicious constructs), and overall complexity of the software programs. There exists a need for improving complex interpretation of software design and providing faster feedback during the development process that is less computationally expensive and provides for another layer of analysis for identifying errors and improving the development process. There also exists a need for a system and method for determining where testing and other software development efforts should be focused, for example when using automated testing. The system and method of the present disclosure overcome the challenges in the prior art and provide for a novel mechanism for determining the amount of code reuse and interdependency and adapting software development based on these metrics to avoid, address, and mitigate various issues and risks as they arise during software development to improve the quality of code ultimately released.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Current developer tools fail to help the developer adequately visualize and understand code interdependency (e.g., code reuse) which is a key part of good software design. Studies have found that code reuse in large projects is very prominent, and it has been concluded that the more code reuse in a project, the higher the subjective code quality existed among the developers. While some code components are meant to be reused frequently (e.g., logger utility function), too many single use components within the software project can indicate a lack of appropriate abstraction across the domain. In other words, components that are not utility functions that are used too many times can point to leaky abstractions. The developers aim for a balance in code reuse.

Among other things, embodiments of the present disclosure improve the functionality of developer tools, methods, and systems by generating a reuse metric associated with the developer's software which can indicate how many and which components are reused infrequently and how many and which components are reused the most frequently. The embodiments of the present disclosure also improve the field of software development by providing a defined metric for identifying common errors in software development and providing an additional level of analysis. In one example, the reuse metric (e.g., RI or reuse indicator) is derived from the frequency distribution's similarity to a type-1 Pareto distribution ($\alpha$) and its raw Kurtosis.

In some embodiments of the present disclosure, a histogram of the reuse metric (or frequency) can be generated and caused to be displayed to provide the developer with the visualization of the quality of the developer's software based on the code reuse and aids the developer in achieving the balance in code reuse. For instance, the optimal, desired histogram can include a minimal peak of imports that represents minimizing low-use, special-purpose components; a short tail which shows that there are few very high-reuse components, indicating leaky abstraction; and a thick tail which indicates higher intra-code base reuse.

In one embodiment, the reuse metric and the histogram of the reuse metric can be used to interpret quality of the code and generate and cause to be displayed information on, for example, refactoring, identified components that require intensive automated testing or regression or smoke tests, the difficulty in adding a new component in the software code base, the difficulty in on-boarding a new developer, the complexity of a merge request, the maintainability of the code base over time, etc. These metrics are useful for software development and may be used to compare a developing code base to an established code base or to itself at a particular point in time or over time.

Embodiments of the present disclosure can further analyze the reuse metric or frequency of component reuse over time and generate and cause to be displayed information on the software code base's modularity trends. Examples of information include information on whether components are being added without making use of existing components, information on whether components need to be informed about many existing components (e.g., indicating high cognitive overhead for developers that are new to the code base and indicating possibly poor abstractions), and information on relative comparisons that can highlight the least and most used modules or components in the system or software base to estimate the potential impact of bugs or places where greater modularity can be employed.

Networked Computing Environment

Figure 1:
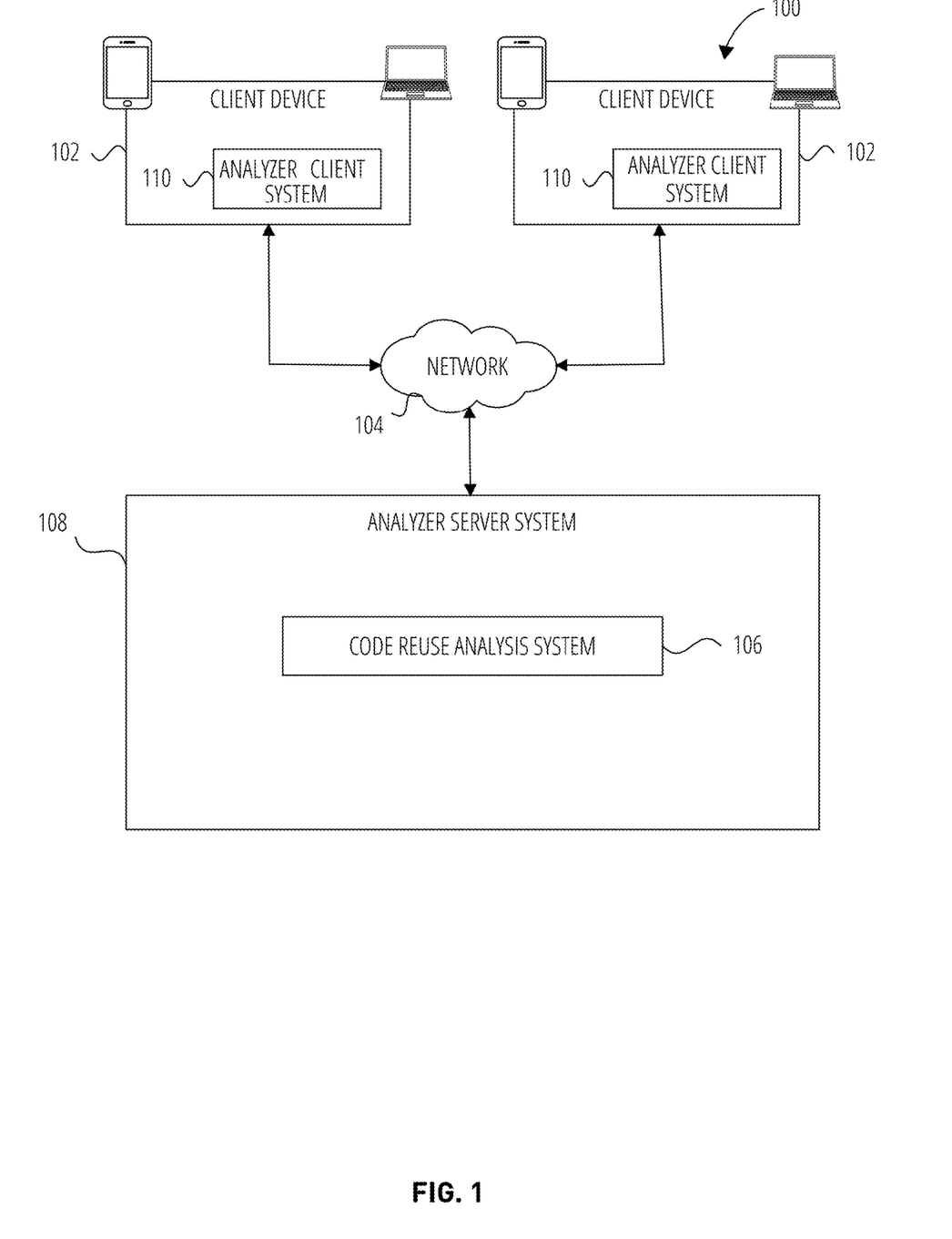
FIG. 1 is a block diagram showing an example system 100 implementing the analyzer server system 108 and analyzer client system 110 according to various exemplary embodiments.

FIG. 1 is a block diagram showing an example system 100 according to various exemplary embodiments. The system 100 can include multiple instances of a client device 102, each of which hosts a number of applications, including an analyzer client system 110. Each of the client devices 102 are communicatively coupled over a network 104 (e.g., Internet, telephony network, electronic communication network or the like). Each analyzer client system 110 is communicatively coupled to an analyzer server system 108 via a network 104.

The analyzer client system 110 is able to communicate and exchange data with another analyzer client system 110 and with the analyzer server system 108 via the network 104. The data exchanged between analyzer client systems 110, and between an analyzer client system 110 and the analyzer server system 108, includes functions (e.g., commands to invoke functions) as well as payload data (e.g., text, software code).

The analyzer server system 108 provides server-side functionality via the network 104 to a particular analyzer client system 110. While certain functions of the system 100 are described herein as being performed by either analyzer server system 108 or by the analyzer client system 110, the location of certain functionality either within the analyzer server system 108 or the analyzer client system 110 may be a design choice. For example, it may be technically preferable to initially deploy certain technology and functionality within the analyzer server system 108 but to later migrate this technology and functionality to the analyzer client system 110 where a client device 102 has sufficient processing capacity.

While FIG. 1 illustrates two client devices 102, it is understood that any number of client devices 102 can be included in the system 100 in other embodiments. As used herein, the term "client device" may refer to any machine that interfaces to a communications network (such as network 104) to obtain resources from one or more server systems or other client devices. A client device may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, game consoles, set-top boxes, or any other communication device that a user may use to access, develop, or evaluate software. The client device 102 can further include elements described with respect to FIG. 5 and FIG. 6, such as a processor and memory, having instructions stored thereon, that when executed by the processor, causes the processor to control the functions of the client device 102 or the analyzer client system 110.

The network 104 may include, or operate in conjunction with, an ad hoc network, an intranet, an extranet, a virtual private network (VPN), a local area network (LAN), a wireless network, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, Gobi™, Bluetooth™, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In the example shown in FIG. 1, a user (e.g., developer) using the client device 102 can use the analyzer client system 110, the analyzer server system 108 or any combination thereof to analyze the quality of a program (e.g., software code base) including a plurality of modules (or components) based on the frequency of reuse of the modules.

The analyzer server system 108 in FIG. 1 includes a code reuse analysis system 106. The analyzer server system 108 can further include elements described with respect to FIG. 5 and FIG. 6, such as a processor and memory, having instructions stored thereon, that when executed by the processor, causes the processor to control the functions of the analyzer server system 108. While in FIG. 1, the code reuse analysis system 106 is illustrated in the analyzer server system 108, it is understood that any portion of the code reuse analysis system 106 can be included in the analyzer client system 110.

Code Reuse Analysis System

Figure 2:
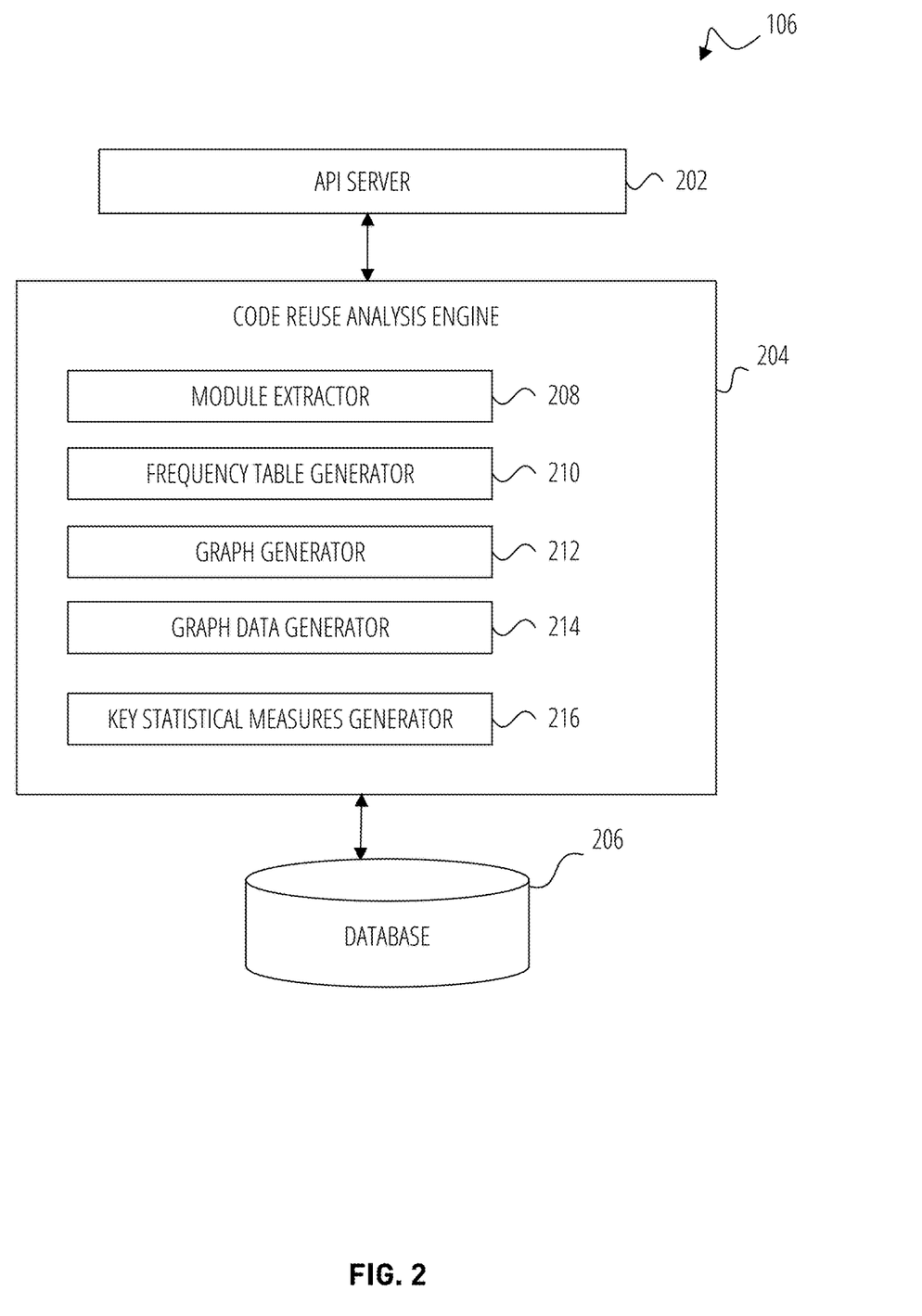
FIG. 2 is block diagram illustrating further details regarding the code reuse analysis system 106, according to exemplary embodiments.

FIG. 2 is block diagram illustrating further details regarding the code reuse analysis system 106, according to exemplary embodiments.

The code reuse analysis system 106 includes an API server 202 that is coupled to and provides a programmatic interface to a code reuse analysis engine 204. For example, the code reuse analysis engine 204, using the API server 202, can receive a request from the client device 102 for an analysis of a program. In one example, the code reuse analysis engine 204, using the API server 202, can receive the program from the client device 102.

As shown in FIG. 2, the code reuse analysis engine 204 comprises module extractor 208, frequency table generator 210, graph generator 212, graph data generator 214, and key statistical measures generator 216.

The module extractor 208 receives the program from the client device 102. The program can be a software project or software code base. The program can include applications and libraries. The program can also include a plurality of modules. The modules can be interdependent modules which includes modules that are imported by other modules or modules that import another module. In one example, the module extractor 208 extracts the interdependent modules in the program. The module extractor 208 aggregates different types of import statements in order to extract the interdependent modules in the program. In one example, the module extractor 208 can receive and process a plurality of programs from client devices 102 that are generated in different programming languages (e.g., Python, TypeScript, Java, Ruby, etc.).

The frequency table generator 210 and the graph generator 212 receive the extracted modules from the module extractor 208. The frequency table generator 210 processes the modules to produce frequency tables for each of the modules. In one example, the frequency table generator 210 determines the import ratios associated with the plurality of modules by determining the number of times the modules are imported within the program (e.g., the numbers of imports associated with the modules). The frequency table generator 210 generates the import ratio as the result of the numbers of imports associated with the modules divided by the total number of modules included in the program. Each of the frequency tables can include the number of imports associated with a module and the import ratio associated with the module. Focusing on the inputs provides for an improvement over the prior art because it simplifies the analysis required. This approach also enables improved analysis of ubiquitous modules, which are often hardest to assess in terms of bug potential and impact. By focusing on frequency, the system and method of the present disclosure provide a solution that is faster and easier to compute and can be used in continuous integration pipelines so that engineers can continuously make changes to the code to improve code quality. Frequency provides a clear indicator that can be readily understood and acted upon by an engineer or engineering team not just after the code has been written but also while the code is in development. In one embodiment, the frequency table generator 210 generates a histogram based on the frequency tables. The histogram comprises a visualization of the modules and the respective import ratios associated with the modules.

The graph generator 212 of the code reuse analysis engine 204 generates graphs based on the extracted modules from the module extractor 208. The graph data generator 214 receives the graphs and generates graph data based on the graphs. The graph data can include, for example, statistical measures for each of the graphs. In one example, the graph data generator 214 can determine cyclomatic complexity using the formula: $cc=e-n+2p$, wherein e is the number of edges of the graph, n is the number of nodes of the graph, and P is the number of connected components or modules.

The key statistical measures generator 216 receives the frequency tables from the frequency table generator 210. In one example, the key statistical measures generator 216 can also receive the graph data from the graph data generator 214. The key statistical measures generator 216 generates a plurality of key statistical measures based on the import ratios and the histogram. For example, the key statistical measures generator 216 can determine and generate a Pareto fit of the histogram (e.g., a), histogram weights (e.g., [weights]), and the Kurtosis of the histogram weights (e.g., K[weights]). The Kurtosis is the tailedness of the histogram weights. In one example, to generate the Pareto fit of the histogram (e.g., $\alpha$), the key statistical measures generator 216 filters the non-negative histogram weights from the histogram and generates the Pareto fit of the non-negative histogram weights. The Pareto fit (e.g., $\alpha$) indicates how close the histogram weights are to the Pareto distribution (or 80-20 rule).

The key statistical measures generator 216 can further generate a reuse metric (e.g., RI or reuse indicator) based on the Pareto fit and a Kurtosis of the histogram weights. In one example, the reuse metric is generated by subtracting the Kurtosis of the histogram weights from the Pareto fit (e.g., $RI=\alpha-K[weights]$). The key statistical measures generator 216 can generate a weak distance metric by taking the absolute value of the reuse metric (e.g., |RI|), etc. In one example, when the reuse metric (or the weak distance metric) is below 0, this indicates a level of reuse that is too low and when the reuse metric (or the weak distance metric) is above 1, this indicates a level of reuse that is too high. In this example, the desired reuse metric (or the weak distance metric) is between 0 and 1.

In one example, the key statistical measures generator 216 generates key statistical measures including the Pareto fit (e.g., $\alpha$), the Kurtosis of the histogram weights (e.g., K[weights]), the reuse metric (e.g., RI), the weak distance metric (e.g., |RI|, or any combination thereof. The key statistical measures can further include properties such as an entropy (e.g., randomness and collected diversity of content), descriptive statistics (e.g., a maximum import ratio, a minimum import ratio, a mean import ratio), a plurality of percentiles associated with the import ratios, skewness or asymmetry or symmetry of the histogram weights wherein a positive number can indicate that the right tail is longer and a negative number can indicate the left tail is longer, dispersion from the mean statistics (e.g., standard deviation of the import ratios, variance of the import ratios, interquartile range of the import ratios), variation of the import ratios, the kurtosis of the histogram weights (e.g., tailedness), modular inconsistency based on the entropy and variation, etc. In one example, the modular inconsistency is the product of the entropy and the variation (e.g., modular_inconsistency=entropy×variation).

In one example, the key statistical measures generator 216 can cause the client device 102 to display the key statistical measures (e.g., the reuse metric, the Pareto fit, Kurtosis of the histogram weights, etc.) as well as the histogram.

The code reuse analysis engine 204 is communicatively coupled to the database 206, in which is stored data processed by the code reuse analysis engine 204 to generate, for example, the key statistical measures, the frequency tables and histograms, as further described herein. In one embodiment, the code reuse analysis engine 204 includes a memory that stores instructions, when executed by a processor, causes processor to perform the operations of the code reuse analysis engine 204.

Examples of practical applications of the system and method of the present disclosure include (1) determining where testing and other software development efforts should be focused, for example when using automated testing, (2) a way to quantify differences between project versions and taking vagueness out of the analysis, and (3) providing indications to engineers over time, or at a specific point in time, as to the frequency of reuse and whether or not certain thresholds of reuse have been exceeded. All of these applications provide for improved analysis, correction, and quality of software code and enables engineers to delay or prevent the release of software when risk is determined based on the frequency of reuse. The system and method are proactive, not just reactive, and provide a novel mechanism for engineers to see issue hot spots and risks before the issue actually occurs. This enables the engineer to adjust the software development to address, mitigate, and/or avoid these issues and risks prior to release.

Data Architecture

Figure 3:
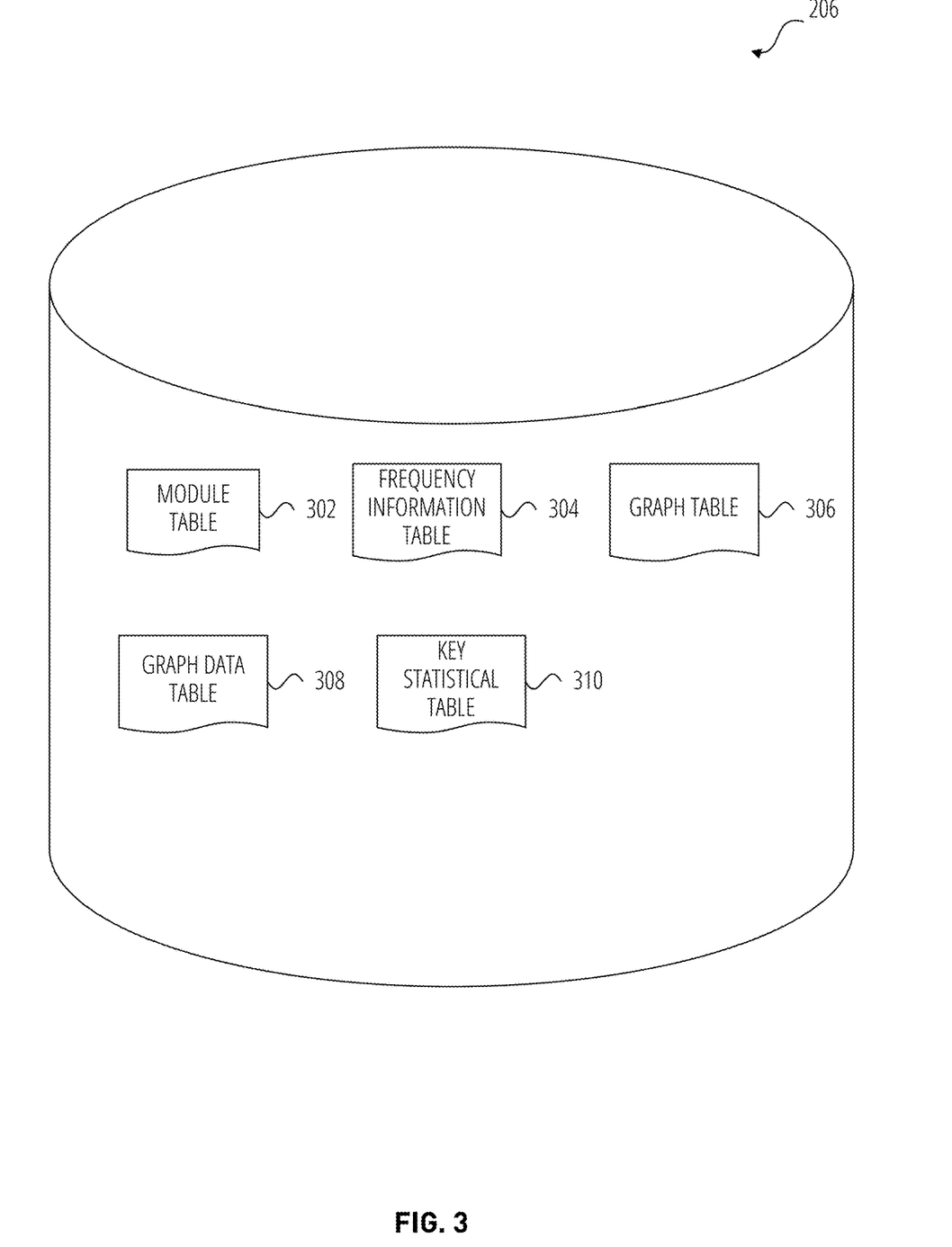
FIG. 3 is a schematic diagram illustrating data which may be stored in the database 206 of the code reuse analysis system 106, according to various exemplary embodiments.

FIG. 3 is a schematic diagram illustrating data that is stored in the database 206 of the code reuse analysis system 106, according to certain exemplary embodiments. While the content of the database 206 is shown to comprise a number of tables, the data could be stored in other types of data structures (e.g., as an object-oriented database). The database 206 includes a module table 302, a frequency information table 304, a graph table 306, a graph data table 308, and a key statistical table 310.

The module table 302 stores the modules extracted by the module extractor 208. In one example, the module table 302 stores modules that are the interdependent modules extracted from the program.

The frequency information table 304 stores frequency tables generated by the frequency table generator 210. In one example, the frequency tables comprise numbers of imports associated with the modules and the import ratios associated with the modules, respectively. The frequency information table 304 can also store the histogram.

The graph table 306 stores the graphs generated by the graph generator 212.

The graph data table 308 stores the graph data generated by the graph data generator 214. For example, the graph data can include statistical measures such as data on adhesion, average level of coreness, average path length, clique number, cohesion, identification of components or modules, diameter, girth, k cores number, radius, motif randesu number, density, order number, size, etc.

The key statistical table 310 stores the data generated by the key statistical measures generator 216. For example, the key statistical table 310 can store the key statistical measures such as the Pareto fit of the histogram (e.g., a), histogram weights (e.g., [weights]), and the Kurtosis of the histogram weights (e.g., K[weights]), the reuse metric (e.g., RI or reuse indicator), the weak distance metric (e.g., |RI|), the properties such as an entropy (e.g., randomness and collected diversity of content), descriptive statistics (e.g., a maximum import ratio, a minimum import ratio, a mean import ratio), a plurality of percentiles associated with the import ratios, skewness or asymmetry or symmetry of the histogram weights, dispersion from the mean statistics (e.g., standard deviation of the import ratios, variance of the import ratios, interquartile range of the import ratios), variation of the import ratios, the kurtosis of the histogram weights (e.g., tailedness), modular inconsistency based on the entropy and variation, etc.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems, such as the systems described in FIG. 1 and/or FIG. 6.

Process of Generating a Reuse Metric and Histogram

Figure 4:
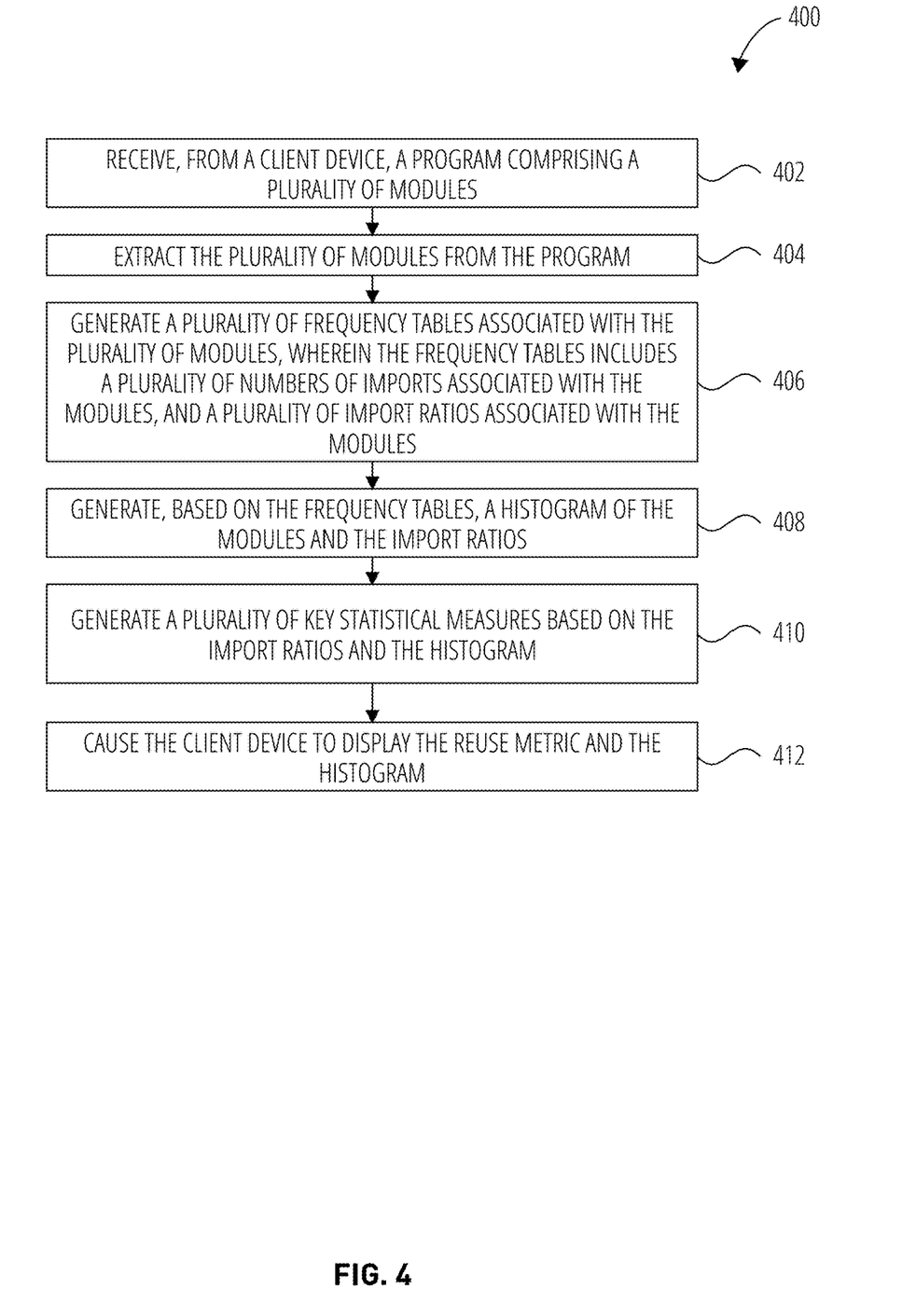
FIG. 4 illustrates a process 400 of generating a reuse metric and histogram in accordance with one embodiment.

FIG. 4 is a flow diagram of an exemplary process of generating a reuse metric and histogram in accordance with one embodiment. In one embodiment, a processor (or circuitry dedicated to performing instructed tasks) included in the code reuse analysis system 106 performs the process 400 or causes the code reuse analysis system 106 to perform the process 400.

In operation 402, the processor receives from a client device, a program comprising a plurality of modules. The plurality of modules can include a plurality of interdependent modules that comprise modules that are imported, modules that import modules, or a combination thereof. In one example, the processor receives a request from the client device to process the program for code reuse.

In operation 404, the processor extracts the plurality of modules from the program.

In operation 406, the processor generates a plurality of frequency tables associated with the plurality of modules. The frequency tables can include a plurality of numbers of imports associated with the modules and a plurality of import ratios associated with the modules. The processor can determine the import ratios associated with the plurality of modules based on the numbers of imports associated with the modules and a total number of modules in the program.

In one example, the processor can generate a plurality of graphs based on the plurality of modules and can generate graph data based on the graphs. The graph data, for each of the graphs, can comprise statistical measures.

In operation 408, the processor generates, based on the frequency tables, a histogram of the modules and the import ratios.

In operation 410, the processor generates a plurality of key statistical measures based on the import ratios and the histogram. In one example, the processor generating the key statistical measures comprises determining histogram weights, determining a Pareto fit of the histogram, and generating a reuse metric based on the Pareto fit and a Kurtosis of the histogram weights.

In one example, the processor filters non-negative histogram weights from the histogram and determines the Pareto fit of the non-negative histogram weights to generate the Pareto fit. The processor can further generate the reuse metric by subtracting the Kurtosis of the histogram weights from the Pareto fit. To generate the key statistical measures, the processor can further generate a weak distance metric by computing an absolute value of the reuse metric. In one example, the key statistical measures comprise the Pareto fit, the Kurtosis of the histogram weights, the reuse metric, the weak distance metric, or any combination thereof.

In one example, the key statistical measures further comprise a plurality of properties including: an entropy, a maximum import ratio, a minimum import ratio, a mean import ratio, a plurality of percentiles associated with the import ratios, skewness of the histogram weights, standard deviation of the import ratios, variance of the import ratios, interquartile range of the import ratios, variation of the import ratios, the kurtosis of the histogram weights, modular inconsistency based on the entropy and the variation, or any combination thereof.

In operation 412, the processor causes the client device to display the reuse metric and the histogram. In another example, the processor causes the key statistical measures to be displayed by the client device. An engineer working on a software project may receive and view one or more of these displays and use the information in the displays to receive real time feedback on the software project. As the engineer is writing the software, the method described herein can provide an indication to the engineer when a certain threshold has been crossed. For example, when too much or too little code reuse is detected, the engineer can receive an indication of this risk and the engineer can then adapt the nature of the software being developed.

Software Architecture

Figure 5:
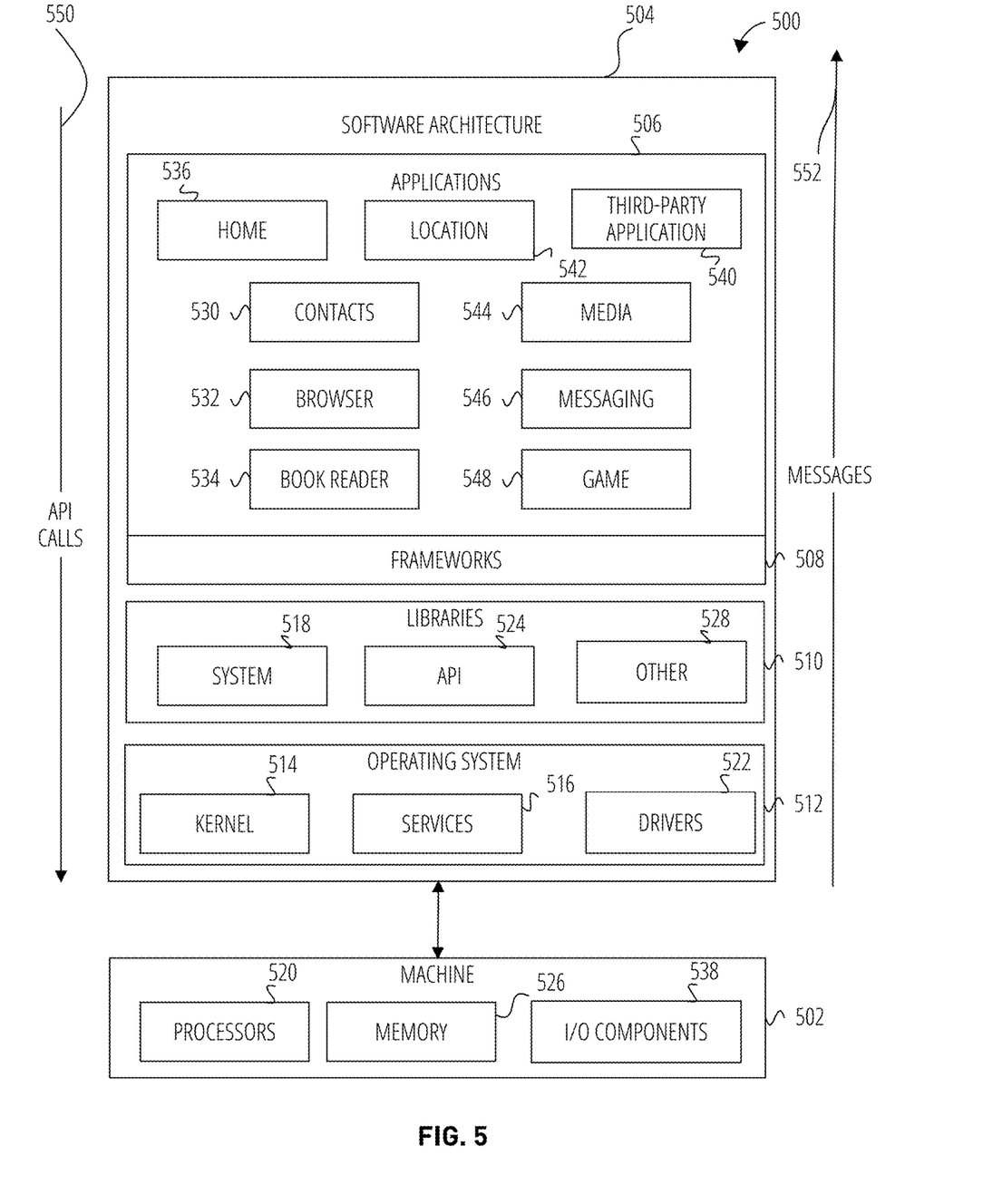
FIG. 5 is a block diagram showing a software architecture within which examples may be implemented.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Machine Architecture

Figure 6:
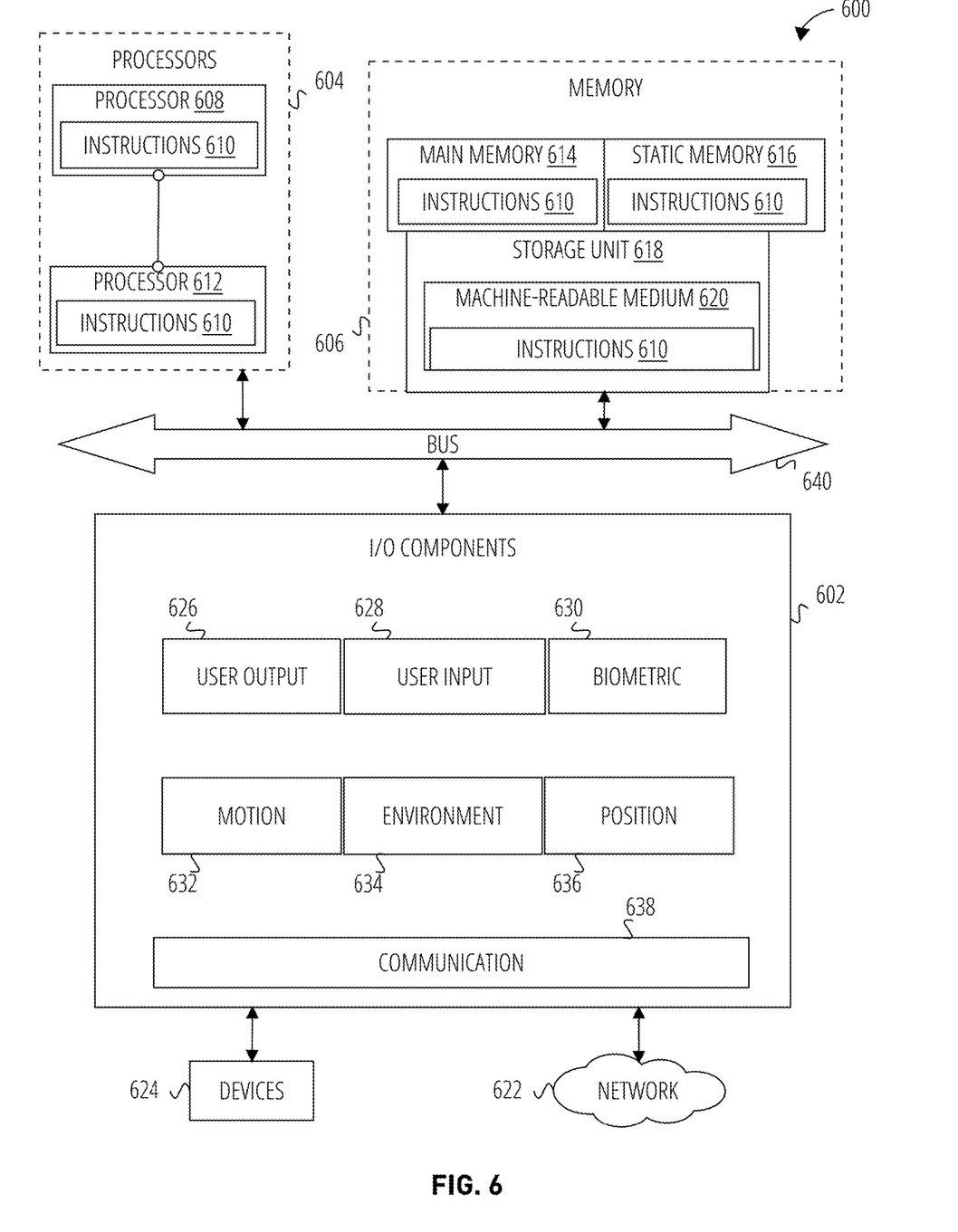
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 610 (e.g., software, a program, an application, an applet, an app, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. The machine 600, for example, may comprise the client device 102 or any one of a number of server devices in client device 102. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 embodying any one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

The invention claimed is:

1. A method comprising:
   receiving, by a processor, from a client device, a program, wherein the program is a software project or software code base that comprises a plurality of modules;
   extracting the plurality of modules from the program;
   generating a plurality of frequency tables associated with the plurality of modules, wherein the frequency tables include a plurality of numbers of imports associated with the modules, and a plurality of import ratios associated with the modules;
   generating, based on the frequency tables, a histogram of the modules and the import ratios;
   generating a plurality of key statistical measures based on the import ratios and the histogram, wherein generating the key statistical measures comprises:
   determining histogram weights,
   determining a Pareto fit of the histogram, and
   generating a reuse metric based on the Pareto fit and a Kurtosis of the histogram weights; and
   causing testing of a least used module in the modules or a most used module in the modules, wherein the least used module and the most used module are identified based on the reused metric.

2. The method of claim 1, wherein the plurality of modules comprise a plurality of interdependent modules, wherein the interdependent modules comprise modules that are imported, modules that import modules, or a combination thereof.

3. The method of claim 1, wherein generating the frequency tables further comprises:
   determining the import ratios associated with the plurality of modules, the import ratios being based on the numbers of imports associated with the modules and a total number of modules in the program.

4. The method of claim 1, wherein generating the key statistical measures further comprises:
   filtering non-negative histogram weights from the histogram.

5. The method of claim 4, wherein determining the Pareto fit of the histogram further comprises:
   determining the Pareto fit of the non-negative histogram weights.

6. The method of claim 5, wherein the reuse metric comprises a result of subtracting the Kurtosis of the histogram weights from the Pareto fit.

7. The method of claim 6, wherein generating the key statistical measures further comprises:
   generating a weak distance metric by computing an absolute value of the reuse metric.

8. The method of claim 7, wherein the key statistical measures comprise the Pareto fit, the Kurtosis of the histogram weights, the reuse metric, the weak distance metric, or any combination thereof.

9. The method of claim 8, wherein the key statistical measures further comprise a plurality of properties including:
   an entropy, a maximum import ratio, a minimum import ratio, a mean import ratio, a plurality of percentiles associated with the import ratios, skewness of the histogram weights, standard deviation of the import ratios, variance of the import ratios, interquartile range of the import ratios, variation of the import ratios, the kurtosis of the histogram weights, modular inconsistency based on the entropy and the variation.

10. The method of claim 8, further comprising:
causing the key statistical measures to be displayed by the client device.

11. The method of claim 8, further comprising:
generating a plurality of graphs based on the plurality of modules;
generating graph data based on the graphs, wherein, for each of the graphs, the graph data comprises statistical measures.

12. The method of claim 1, wherein the program is a system code base.

13. A non-transitory computer-readable storage medium, the computer-readable storage medium storing instructions that when executed by a processor, cause the processor to perform operations comprising:
receiving from a client device, a program, wherein the program is a software project or software code base that comprises a plurality of modules;
extracting the plurality of modules from the program;
generating a plurality of frequency tables associated with the plurality of modules, wherein the frequency tables include a plurality of numbers of imports associated with the modules, and a plurality of import ratios associated with the modules;
generating, based on the frequency tables, a histogram of the modules and the import ratios;
generating a plurality of key statistical measures based on the import ratios and the histogram, wherein generating the key statistical measures comprises:
determining histogram weights,
determining a Pareto fit of the histogram, and
generating a reuse metric based on the Pareto fit and a Kurtosis of the histogram weights; and
causing testing of a least used module in the modules or a most used module in the modules, wherein the least used module and the most used module are identified based on the reused metric.

14. The non-transitory computer-readable storage medium of claim 13, wherein the plurality of modules comprise a plurality of interdependent modules, wherein the interdependent modules comprise modules that are imported, modules that import modules, or a combination thereof.

15. The non-transitory computer-readable storage medium of claim 13, wherein generating the frequency tables further comprises:
determining the import ratios associated with the plurality of modules, the import ratios being based on the numbers of imports associated with the modules and a total number of modules in the program.

16. The non-transitory computer-readable storage medium of claim 13, wherein generating the key statistical measures further comprises:
filtering non-negative histogram weights from the histogram, and
wherein determining the Pareto fit of the histogram further comprises determining the Pareto fit of the non-negative histogram weights.

17. The non-transitory computer-readable storage medium of claim 16, wherein the reuse metric comprises a result of subtracting the Kurtosis of the histogram weights from the Pareto fit.

18. The non-transitory computer-readable storage medium of claim 17, wherein generating the key statistical measures further comprises:
generating a weak distance metric by computing an absolute value of the reuse metric.

19. The non-transitory computer-readable storage medium of claim 18, wherein the key statistical measures comprise the Pareto fit, the Kurtosis of the histogram weights, the reuse metric, the weak distance metric, or any combination thereof.

20. A system comprising:
a processor; and
a memory storing instructions that, when executed by the processor, causes the system to perform operations comprising:
receiving from a client device, a program, wherein the program is a software project or software code base that comprises a plurality of modules;
extracting the plurality of modules from the program;
generating a plurality of frequency tables associated with the plurality of modules, wherein the frequency tables include a plurality of numbers of imports associated with the modules, and a plurality of import ratios associated with the modules;
generating, based on the frequency tables, a histogram of the modules and the import ratios;
generating a plurality of key statistical measures based on the import ratios and the histogram, wherein generating the key statistical measures comprises:
determining histogram weights,
determining a Pareto fit of the histogram, and
generating a reuse metric based on the Pareto fit and a Kurtosis of the histogram weights; and
causing testing of a least used module in the modules or a most used module in the modules, wherein the least used module and the most used module are identified based on the reused metric.

* * * * *